(12) United States Patent
Adriaensen et al.

(10) Patent No.: US 6,276,120 B1
(45) Date of Patent: Aug. 21, 2001

(54) PUSH-PULL STEEL CABLE WITH COATING OF POLYETHYLENE TEREPHTHALATE

(75) Inventors: Ludo Adriaensen; Gerard Vandewalle, both of Deerlijk (BE)

(73) Assignee: N.V. Bekaert S.A., Zwevegem (BE)

( * ) Notice: Subject to any disclaimer, the term of this patent is extended or adjusted under 35 U.S.C. 154(b) by 0 days.

(21) Appl. No.: 09/367,832

(22) PCT Filed: Mar. 3, 1998

(86) PCT No.: PCT/EP98/01294

§ 371 Date: Aug. 25, 1999

§ 102(e) Date: Aug. 25, 1999

(87) PCT Pub. No.: WO98/40554

PCT Pub. Date: Sep. 17, 1998

(30) Foreign Application Priority Data

Mar. 13, 1997 (EP) .................................................. 97200756

(51) Int. Cl.⁷ .................................. D02G 3/02; F16C 1/20
(52) U.S. Cl. ................................ 57/210; 57/211; 57/212; 57/213; 74/502.5
(58) Field of Search .................. 57/210–213, 216–218, 57/220–223, 237, 238; 74/502.5; 188/24.21

(56) References Cited

U.S. PATENT DOCUMENTS

| | | | |
|---|---|---|---|
| 3,985,041 | * 10/1976 | Gilmore | 74/502.5 |
| 4,052,911 | * 10/1977 | Feldstein | 74/502.5 |
| 4,541,303 | * 9/1985 | Kuzunishi | 74/502.5 |
| 4,898,046 | * 2/1990 | Mancewicz et al. | 74/502.5 |
| 5,245,887 | * 9/1993 | Tanaka et al. | 74/502.5 |

FOREIGN PATENT DOCUMENTS

| 1283911 | * 8/1972 | (GB) | ............................ F16C/1/10 |
| 1563712 | 3/1980 | (GB) . | |

OTHER PUBLICATIONS

Patent Abstracts of Japan, vol. 14, No. 295 (M–0990), JP 02 093113, Jun. 26, 1990.
Patent Abstracts of Japan, vol. 9, No. 209 (M–407), JP 60 069315, Aug. 27, 1985.

* cited by examiner

Primary Examiner—John J. Calvert
Assistant Examiner—Robert H. Muromoto, Jr.
(74) Attorney, Agent, or Firm—Foley & Lardner

(57) ABSTRACT

A push-pull steel cable (10) comprises a core (12) and an outer layer of filaments (16) twisted around the core (12). The cable (10) is provided with an external coating (20) of polyethylene terephthalate. The coating (20) gives to the cable (10) a good resistance against corrosion, a good weatherability, a good adhesion and adhesion retention and a friction resistance which is comparable to the friction resistance of a cable with a nylon coating. The cable (10) can be used as a brake cable, a shifting lever cable or a window elevator cable.

13 Claims, 2 Drawing Sheets

PUSH-PULL STEEL CABLE WITH COATING OF POLYETHYLENE TEREPHTHALATE

FIELD OF THE INVENTION

The present invention relates to a push-pull steel cable comprising a core and an outer layer of filaments twisted around the core, and possibly an intermediate layer of filaments between the core and the outer layer.

The present invention particularly relates to a push-pull steel cable for use as a brake cable or as a derailleur or shift lever cable in vehicles or for use as a window elevator cable or cable for directing mirrors in vehicles.

Typically for such a push-pull steel cable is that it exercises a to and fro movement inside a casing. So the cable must meet high requirements such as good corrosion resistance, high flexibility, low friction resistance, high tensile strength and high fatigue resistance.

Within the context of the present invention, it is irrelevant whether or not the to and fro movement inside the casing is exercised by means of spring.

BACKGROUND OF THE INVENTION

Push-pull steel cables are known as such in the art.

For example, such a steel cable comprises a core and an intermediate layer with zinc coated filaments and an outer layer of filaments coated with a tin-lead alloy. Although having a low friction resistance due to the tin-lead alloy coating on the filaments of the outer layer, such a cable has a number of drawbacks. Apart from the drawback of using two different types of coatings, zinc for the filaments of the core and the intermediate layer and tin-lead for the filaments of the outer layer, there is the major drawback of using lead in one of the coatings, which may cause environmental problems.

Another example is a steel cable consisting only of stainless steel filaments. Such a cable has the advantage of a good resistance against corrosion but has the drawback inherent to stainless steels that the tensile strength is rather limited, which means that thicker and heavier filaments must be used in order to obtain the same breaking load.

Japanese patent application JP-A-02/093113 discloses a push-pull cable with a coating of polybutylene terephtalate (PBT) resin. Also the liner of the casing of the push-pull cable, i.e. the inner coating of the casing, comprises PBT.

Japanese patent application JP-A-52/033944 discloses a control cable with a coating of a PBT graphite wax. The liner of the casing also comprises PBT graphite wax.

SUMMARY OF THE INVENTION

The present invention aims at avoiding the problems of the prior art.

It is an object of the present invention to provide a cable which can be manufactured in an environment friendly way.

It is another object of the present invention to allow for applying different colors on the coating of a cable.

It is still another object of the present invention to provide for a coating which is resistant against corrosion, which gives sufficient adhesion and adhesion retention in humid conditions, which gives a low friction resistance to the cable and which gives the cable a good weatherability.

Yet another object of the present invention is to obtain a good corrosion resistance in combination with a high tensile strength.

According to a first aspect of the present invention, there is provided a steel cable which comprises a core and an outer layer of filaments twisted around the core. The steel cable is provided with an external coating of polyethylene terephtalate. There is possibly also an intermediate layer of filaments between the core and the outer layer.

Within the context of the present invention, the terms "polyethylene terephtalate" or "PET" denote not only homopolymers of ethylene therephtalate but also copolymers of ethylene terephtalate containing not more than 20% of other copolymerized units, e.g. derived from other acids than terephtalic acid, such as isophtalic acid or from other glycols than ethylene glycol. The polymer may also contain mixtures of polymers in order to modify certain of the properties thereof.

In comparison with coatings of polyamides such as nylon-6 (PA6), a polyethylene terephtalate coating gives the cable a friction resistance which is equally low. In addition thereto, the polyethylene teraphtalate coating has a better adhesion and adhesion retention, has a higher corrosion resistance, has a better resistance against ultra-violet light (=) better weatherability) and has a lower absorption of water or moisture. A polyethylene teraphtalate coating absorbs only one tenth of the amount of moisture absorbed by a nylon-6 coating in the same circumstances. This means that a steel cable with a polyethylene teraphtalate coating does not swell up to the same degree as a steel cable with a nylon-6 coating. Moreover, application of a polyethylene teraphtalate coating can be done in an environment-friendly way, i.e. with a much more simpler pre-treatment and without the use of primers.

Due to the higher corrosion resistance given by the coating to the cable, plain carbon steels or high-carbon micro-alloyed steels (from 0.70% to 1.10% C with additions of Cr, V, Cu, Ni, B or Nb . . . up to maximum 0.50%) can be used instead of stainless steels so that much higher tensile strengths (up to 3000 MPa and higher) can be obtained. This results in cables which are lighter and more flexible.

The coating of the extruded material preferably has a thickness ranging from 20 micrometer to 120 micrometer, most preferably from 0.20 micrometer to 60 micrometer. Such thin coatings are difficult to achieve with polyvinylchloride due to the substantially different viscosity values. Preferably the coating on the cable is so thin that it still shows the cable structure, i.e. the irregularities of the surface of the outer layer. This thin coating is favorable to the flexibility of the cable.

The extruded material preferably has a melt viscosity measured at about 280° C. ranging from 100 Pa.s to 2500 Pa.s for a corresponding shear rate going down from 10000 1/s to 1 1/s. A still more preferable value is a melt viscosity ranging from 200 Pa.s to 1000 Pa.s for a corresponding shear rate going down from 5000 1/s to 20 1/s.

The PET coating is preferably more than 50% amorphous. This may be achieved by rapid cooling after the extrusion process. In comparison with a crystalline structure of the coating, an amorphous polyethylene teraphtalate coating, for example, has a more pronounced luster and is more flexible. Recrystallisation, however, may occur in course of time. In comparison with a PBT coating, recrystallisation happens much slower with a PET coating. This is an advantage for a PET coating.

The steel cable may be provided with a lubricant oil, such as a silicon oil, on top of the polyethylene teraphtalate coating in order to further reduce the friction resistance.

In order to further increase the corrosion resistance, the cable further comprises a synthetic product, a super absorbent powder or a lubricant between the core and the outer layer. The synthetic product may be in the form of another extruded layer of polyethylene teraphtalate around the core filament or core filaments.

Another measure to increase the corrosion resistance is that the filaments of the cable have an individual metal coating of zinc or of a zinc alloy such as a BEZINAL® alloy comprising 95% zinc and 5% aluminium.

According to a second aspect of the present invention, a push-pull steel cable according to the first aspect of the present invention can advantageously be used as:

a brake cable for vehicles such as bicycles, jetscooters and snowscooters;

derailleur or shift lever cable for vehicles such as bicycles, jetskis, waterskis and scooters;

an elevator cable for windows in vehicles or a cable for directing mirrors in vehicles.

Conveniently, the diameter of the steel filaments ranges from 0.10 mm to 0.50 mm, e.g. from 0.25 mm to 0.35 mm. The filaments may have been flattened or rolled. The non-circular transversal cross-section of the filaments can also be the consequence of the compacting of the cable as a result of pulling the cable through a compacting die. In the case of a non-circular transversal cross-section, the term 'diameter' refers to the diameter of a circular cross-section with the same surface as the non-circular.

The outer diameter of the cable, inclusive the coating, may range from 0.80 mm to 2.50 mm, e.g. from 1.0 mm to 1.80 mm.

BRIEF DESCRIPTION OF THE DRAWINGS

The invention will now be described with reference to the annexed drawings wherein.

DESCRIPTION OF THE PREFERRED EMBODIMENTS OF THE INVENTION

Figure 1:
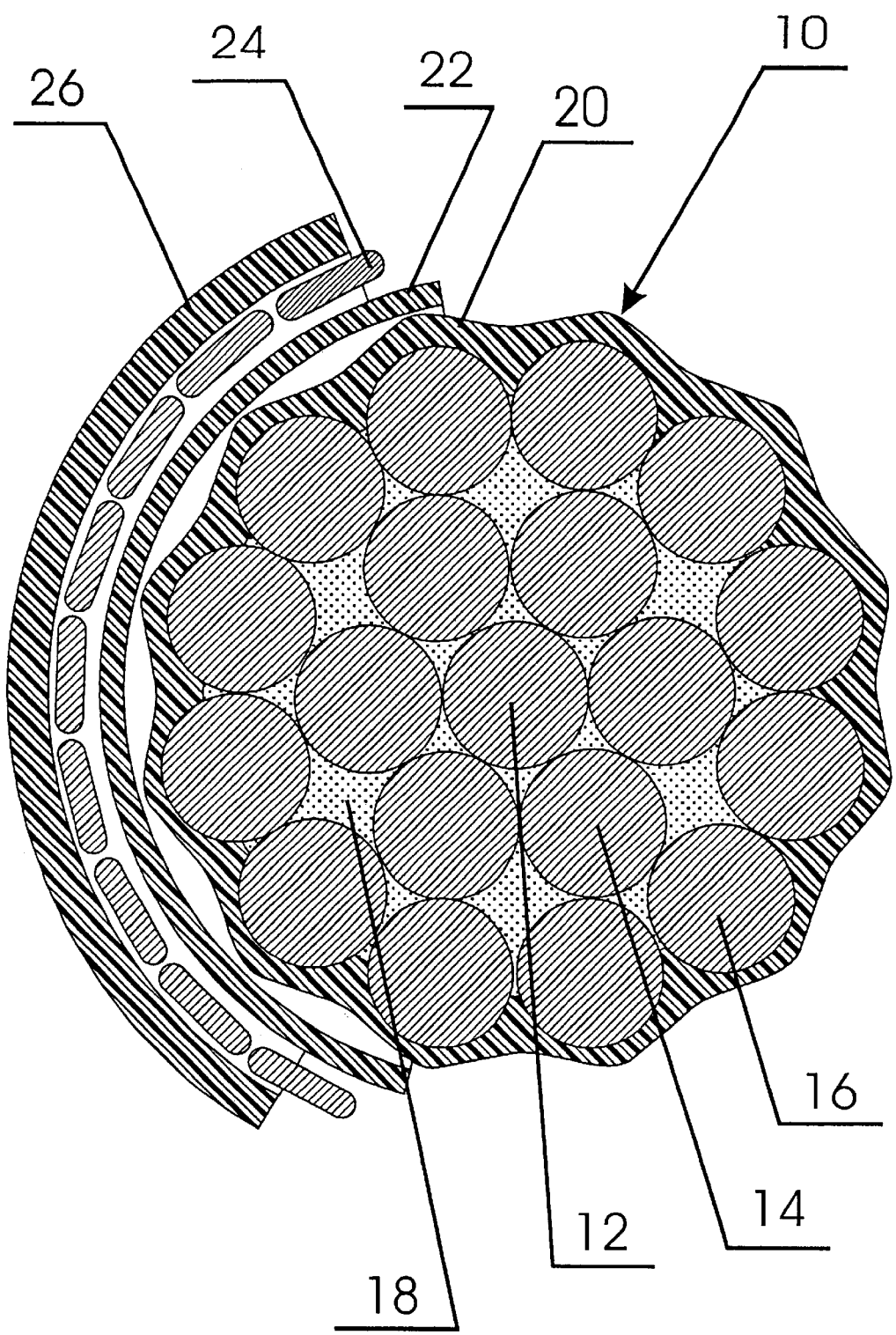
FIG. 1 shows a transversal cross-section of a cable according to the present invention.

FIG. 1 shows a transversal cross-section of a cable 10 according to the present invention. Cable 10 comprises one core filament 12, an intermediate layer of six filaments 14 twisted around the core filament 12, and an outer layer of twelve filaments 16 twisted around the intermediate layer. The cable 10 further comprises a lubricant oil or grease 18 inside, i.e. between the core filament 12 and the filaments 14 of the intermediate layer and between the filaments 14 of the intermediate layer and the filaments 16 of the outer layer. A thin polyethylene teraphtalate coating 20 has been extruded around the outer layer. The coating 20 shows the structure of the cable, i.e. at each undulation there is a filament 16 of the outer layer at the inside.

As a matter of example, the cable 10 has following characteristics diameter of core filament 12=0.26 mm diameter of filaments 14 of the intermediate layer=0.24 mm diameter of filaments 16 of the outer layer=0.24 mm twist of intermediate layer: twist pitch is 9 mm in Z-direction twist of outer layer: twist pitch is 12 mm in S-direction breaking load=1900 Newton tensile strength=2080 MPa elongation at fracture=3.0% diameter of cable 10=1.21 mm.

With these dimensions the cable can be used as a shift lever cable for bicycles.

Cable 10 can also have a twist pitch and a twist direction which is equal for all filaments 12, 14 and 16. As is known in the art, such a cable can be made in one single step. Cable 10 can also have been carried out in a Warrington version, i.e. thinner filaments 16 which alternate with thicker filaments 16 in order to give a round cross-section to the cable 10.

The push-pull cable 10 performs a to and fro movement in a casing. This casing comprises an thin inner coating or liner 22 made of polyethylene terephtalate, a reinforcing layer with flat steel wires 24 or round steel wires 24 and a thicker outer coating 26 of polyvinylchloride, polyethylene or polypropylene.

Other constructions such as a 1+6 or 1+5 are also suitable for use as a push-pull cable.

A cable 10 according to the invention can be made as follows.

The starting material is a wire rod with a composition along the following lines: a carbon content ranging from 0.45% to 0.86%, a silicon content ranging from 0.10% to 0.70%, a manganese content ranging from 0.30% to 0.90%, a maximum sulphur content of 0.05%, a maximum phosphorous content of 0.05%, and possibly up to 0.50% of a combination of chromium, nickel, vanadium, molybdenum and/or copper.

The wire rod is hard drawn in various subsequent steps, if needed alternated with one or more intermediate patenting steps. Before the last drawing step, the wires are subjected to a hot dip or electroplating galvanizing treatment. The finally drawn filaments are covered with a suitable grease and are twisted in a cable by means of conventional double-twisting machines or tubular twisting machines. The outer surface is degreased and finally the cable 10 is covered with a polyethylene teraphtalate coating by means of an extrusion process.

Figure 2:
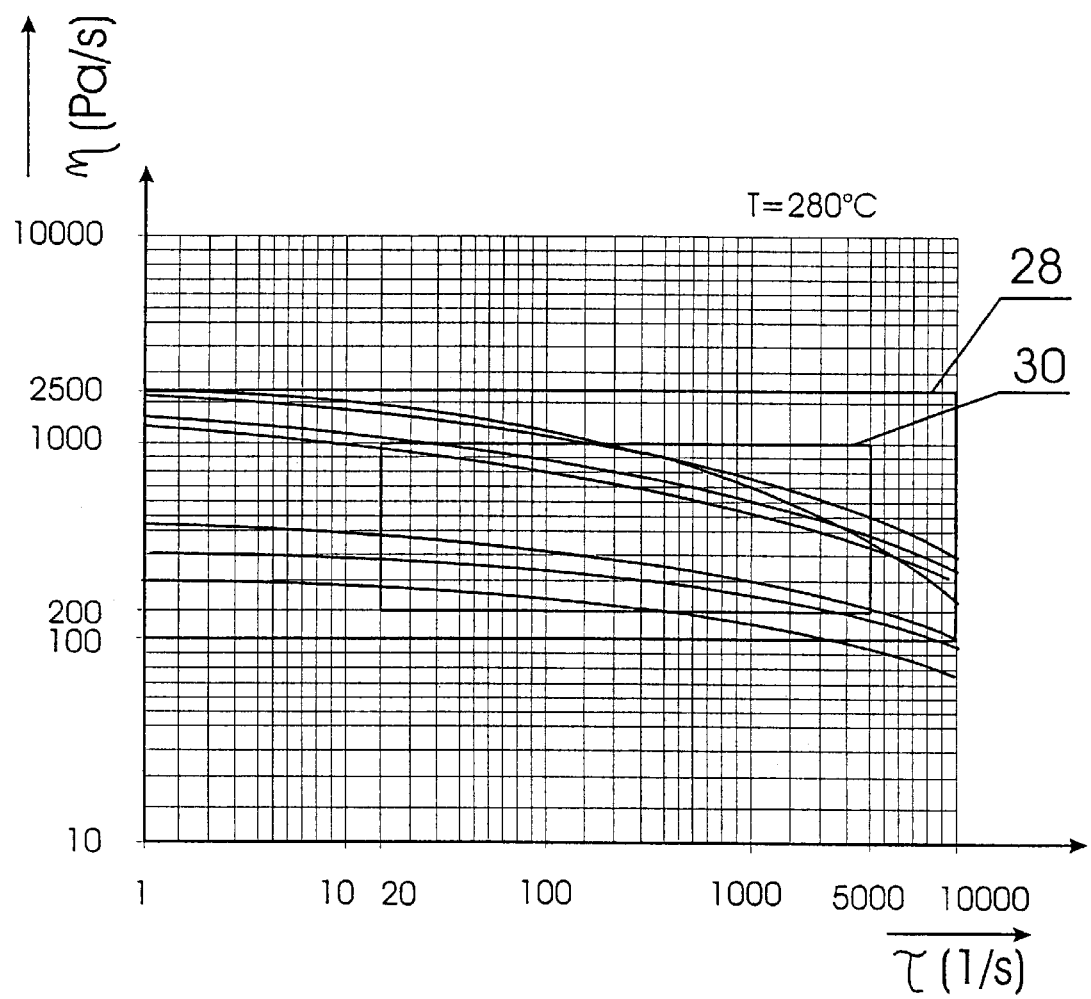
FIG. 2 shows viscosity curves in function of the shear rate.

FIG. 2 shows the curves of viscosity values $\eta$ (expressed in Pa.s) of polyethylene teraphtalate in function of the shear rate $\tau$ (expressed in 1/s and measured at a temperature of 280° C. The preferable field of viscosity/shear rate values is referred to by 28 and the most preferable field of viscosity/shear rate values is referred to by 30.

Since push-pull cables are to move to and fro inside a casing, the friction resistance of such a cable inside the casing is of utmost importance. A test has been carried out to measure the friction resistance of an invention cable inside two different types of casing and to compare this values with the corresponding values of friction resistance of a cable covered with a nylon-6 coating.

The friction resistance $\mu$ is defined as:

$$\mu = 100 \times F_p / (F_p + F_d)(\%)$$

where $F_p$ is force exercised by the axial pre-load mass and $F_d$ is the friction force. The friction force $F_d$ measured here is not the static friction force, measured just before the beginning of the cable movement inside the case but the dynamic friction force, measured when the cable is moving inside the casing.

The table hereunder summarizes the results.

TABLE

| type of casing → | sealed | | normal | |
|---|---|---|---|---|
| type of coating ↓ | μ (%) | std (μ) | μ (%) | std (μ) |
| black PET | 87 | 1.9 | 70 | 0.5 |
| invention | 85 | 2.8 | 72 | 0.4 |
| green PET | 81 | 1.6 | 69 | 0.5 |
| invention | 81 | 0.6 | 70 | 0.2 |
| white PET | 81 | 1.6 | 73 | 0.3 |
| invention | 81 | 0.5 | 73 | 0.9 |
| black nylon-6 | 81 | 0.6 | 69 | 0.3 |
| reference | 81 | 0.9 | 72 | 0.4 | axial preload $F_p$ = 51.5 Newton
speed of cable through casing = 8 mm/s
std (μ) = standard deviation of friction resistance
PET = polyethylene teraphtalate As may be derived from the above table, an invention cable has about the same frictional resistance as a cable coated with nylon-6. The type of casing has more influence on the friction resistance than the change from nylon to polyethylene teraphtalate.

What is claimed is:

1. A push-pull inner steel cable for sliding within a casing, said inner steel cable comprising:
   a core; and
   an outer layer of filaments twisted around the core, the inner steel cable being provided with an external coating of polyethylene terephthalate around and fixed to said outer layer of filaments.

2. An inner steel cable according to claim 1 wherein the cable further comprises an intermediate layer of filaments between the core and the outer layer.

3. An inner steel cable according claim 1, wherein the coating has a thickness ranging from 20 micrometer to 120 micrometer.

4. An inner steel cable according to claim 1, wherein the material of the coating has a melt viscosity measured at about 280° C. and ranging from 100 Pa.s to 2500 Pa.s for a shear rate ranging from 1 1/s to 10000 1/s.

5. An inner steel cable according claim 1, wherein the cable further comprises a synthetic product between the core and the outer layer.

6. An inner steel cable comprising a core and an outer layer of filaments twisted around the core, the inner steel cable being provided with an external coating of polyethylene terephthalate, wherein the cable further comprises a super absorbent powder between the core and the outer layer.

7. An inner steel cable according to claim 1, wherein the cable further comprises a lubricant between the core and the outer layer.

8. An inner steel cable according to claim 1, wherein the filaments have a filament diameter ranging from 0.10 mm to 0.50 mm.

9. An inner steel cable according to claim 1, wherein some or all of the filaments have been rolled or flattened.

10. An inner steel cable according to claim 1, wherein the coating is at least 50% amorphous.

11. An inner steel cable according to claim 1, wherein the cable is provided with a lubricant oil on top of the coating.

12. An inner steel cable comprising a core and an outer layer of filaments twisted around the core, the inner steel cable being provided with an external coating of polyethylene terephthalate, wherein the filaments have an individual metal coating of zinc or a zinc alloy.

13. An inner steel cable comprising a core and an outer layer of filaments twisted around the core, the inner steel cable being provided with an external coating of polyethylene terephthalate, wherein the coating thickness allows the irregularities of the outer layer to be seen.

* * * * *